US009355457B1

(12) United States Patent
Kim et al.

(10) Patent No.: US 9,355,457 B1
(45) Date of Patent: May 31, 2016

(54) EDGE DETECTION USING MULTIPLE COLOR CHANNELS

(71) Applicant: Adobe Systems Incorporated, San Jose, CA (US)

(72) Inventors: Byungmoon Kim, Sunnyvale, CA (US); Sunil Hadap, Dublin, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/687,396

(22) Filed: Apr. 15, 2015

(51) Int. Cl.
*G06K 9/00* (2006.01)
*G06T 7/00* (2006.01)

(52) U.S. Cl.
CPC ..... *G06T 7/0085* (2013.01); *G06T 2207/10024* (2013.01)

(58) Field of Classification Search
CPC ............... G06T 7/408; G06T 7/0081; G06T 2207/10024; G06T 7/0085; G06K 9/4652; G06F 17/30243
See application file for complete search history.

(56) References Cited

U.S. PATENT DOCUMENTS

| 4,908,698 | A | * | 3/1990 | Enomoto | H04N 9/64 348/396.1 |
| 5,544,263 | A | * | 8/1996 | Iwamura | G06T 7/2013 375/240.16 |
| 6,665,439 | B1 | * | 12/2003 | Takahashi | G06K 9/0063 382/165 |
| 6,697,497 | B1 | * | 2/2004 | Jensen | G06T 7/0083 382/100 |
| 7,277,582 | B2 | | 10/2007 | Paragios | |
| 7,813,822 | B1 | | 10/2010 | Hoffberg | |
| 7,907,793 | B1 | | 3/2011 | Sandrew | |
| 8,155,391 | B1 | | 4/2012 | Tang | |
| 8,175,409 | B1 | | 5/2012 | Wilensky | |
| 8,432,392 | B2 | * | 4/2013 | Kim | H04N 13/026 345/419 |
| 8,737,730 | B2 | * | 5/2014 | Sloan | H04N 1/60 345/582 |
| 2002/0118875 | A1 | | 8/2002 | Wilensky | |
| 2004/0220965 | A1 | | 11/2004 | Harville et al. | |
| 2005/0025359 | A1 | | 2/2005 | Priddy | |

(Continued)

OTHER PUBLICATIONS

Junru et al., "Research on Edge Extraction with Level Set Method", The International Archives of the Photogrammetry, Remote Sensing and Spatial Information Sciences, vol. XXXVII, Part B4, pp. 433-438 (2008).

(Continued)

*Primary Examiner* — Amir Alavi
(74) *Attorney, Agent, or Firm* — Finch & Maloney PLLC

(57) ABSTRACT

Techniques are provided for detecting edges in a color image by analyzing variations in multiple color channels. No greyscale conversion is performed, thereby preserving color differences which might be lost in greyscale conversion. Gradients in multiple color channels are merged to compute a single edge snapping vector field from which edge locations are derived. By retaining the multidimensional characterization of the colors that comprise the processed image, a maximum color difference can be calculated using parameters which closely correspond to human perceptions of color. Maximum color difference is formulated using an LUV color model. The Euclidian distance between two pixels characterized using a multidimensional color model more closely approximates a perceived color difference between as compared to the Euclidian distance between the same pixels characterized using a greyscale color model. An edge snapping vector field is derived from these Euclidian distances, thereby providing a more accurate basis for edge detection.

20 Claims, 7 Drawing Sheets
(5 of 7 Drawing Sheet(s) Filed in Color)

(56) References Cited

U.S. PATENT DOCUMENTS

| | | |
|---|---|---|
| 2006/0053374 A1 | 3/2006 | Wilensky |
| 2006/0155398 A1 | 7/2006 | Hoffberg et al. |
| 2008/0019587 A1 | 1/2008 | Wilensky et al. |
| 2008/0122858 A1 | 5/2008 | Wilensky |
| 2008/0131010 A1 | 6/2008 | Wilensky |
| 2008/0263012 A1 | 10/2008 | Jones |
| 2012/0063681 A1 | 3/2012 | Sandrew et al. |
| 2014/0258941 A1 | 9/2014 | Lim et al. |

OTHER PUBLICATIONS

Osher et al., "Level Set Methods and Dynamic Implicit Surfaces", Springer-Verlag, pp. 3-39 and 119-134 (2003).

Sethian, ¡oSet Methods and Fast Marching Methods¡±, Cambridge University Press, pp. 73-74 (1999).

* cited by examiner

Source Image
(10)

(Prior Art)

Detected Edges
(24)

Detected Edges
(24)

EDGE DETECTION USING MULTIPLE COLOR CHANNELS

FIELD OF THE DISCLOSURE

This disclosure relates generally to digital analysis of color images, and more specifically to techniques for detecting edges in a color image by analyzing variations in multiple color channels which are used to characterize the image.

BACKGROUND

A wide variety of software tools have been developed to facilitate the process of manipulating digital data. For example, digital image editing software applications such as Adobe® Photoshop® (Adobe Systems Incorporated, San Jose, Calif.) allow users to adjust, modify, and otherwise manipulate digital images. Such applications generally allow a user to make global manipulations to an entire image as well as localized manipulations that affect only a selected portion of an image. Localized manipulations are useful, for example, if a user wishes to adjust the brightness of a person's face or change the color hue of a flower without altering the remainder of the image. Localized manipulations also enable a user to copy and/or extract a selected portion of an image. In general, making a localized manipulation can be understood as comprising a two-step process of first selecting a portion of the image that is to be manipulated and then applying the desired manipulation to that selection. Selecting the portion of the image that is to be manipulated generally involves detecting a boundary or "edge" that separates the selected region of the image from the unselected region. In some cases the edge can be defined based entirely on user input, for example by a user drawing a boundary using a mouse or other pointing device. But more often the edge detection process is partially or fully automated using digital image processing techniques. Automating the edge detection process can improve its efficiency and accuracy, which in turn facilitates the creation of a selection mask that more precisely defines the localized portion of the image which is to be copied, extracted, or otherwise manipulated. Once the selection mask is defined, the desired operation can be applied on a localized basis.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
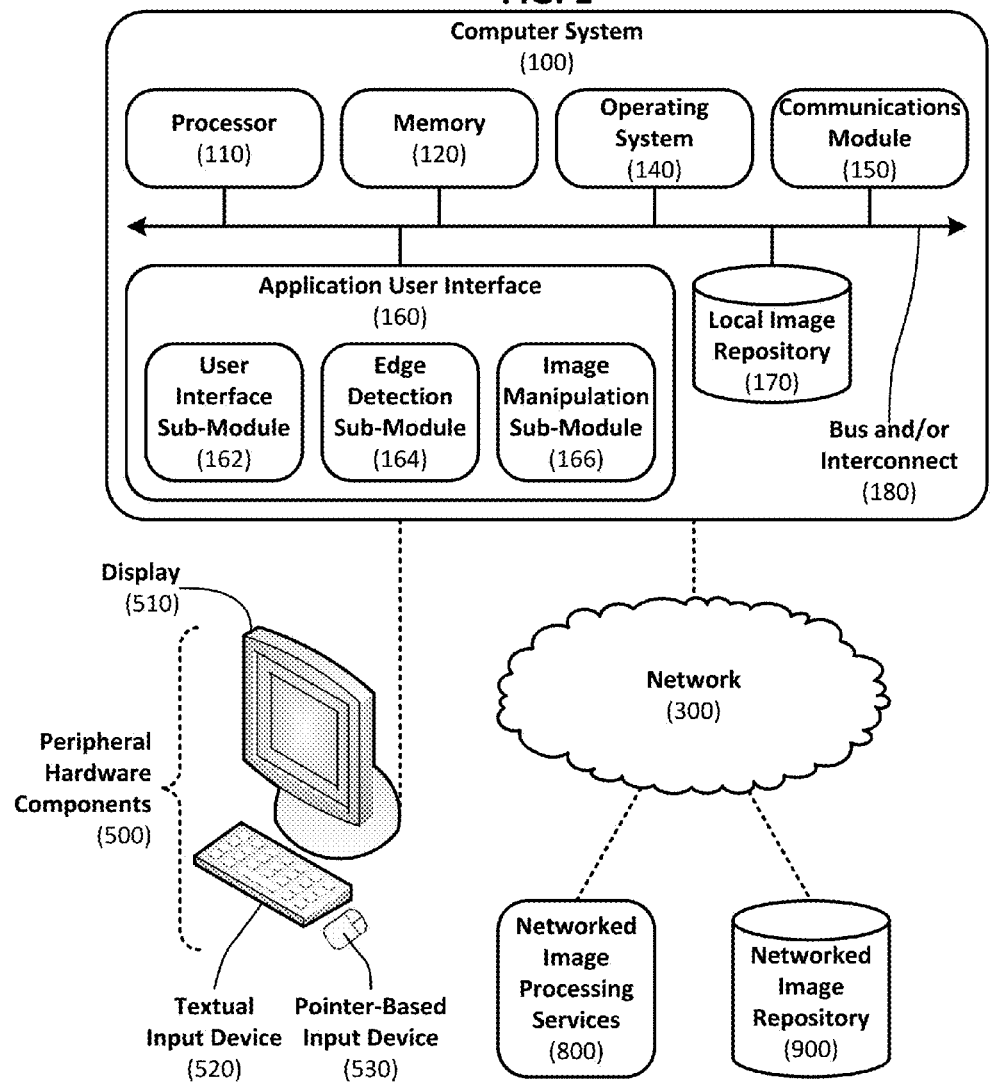
FIG. 1 is a block diagram schematically illustrating selected components of an example computer system that can be used to detect edges in a color image by analyzing variations in multiple color channels which are used to characterize the image.

Edge detection is an important aspect of some of the most popular features associated with digital image editing software. For example, consumers often use digital image editing software to manipulate images on a localized basis, with edge detection techniques being used to define the localization. In addition, many of the visual effects that can be applied using digital image editing software manipulate the appearance of detected edges in an image. Accurate edge detection is therefore important when working with such visual effects, examples of which include smoothing, blurring, diffusing, and sharpening effects. However, despite their importance, the edge detection tools provided by existing software often fall short of consumer expectations. Many existing automated edge detection techniques rely on characterizing an image in terms of an edge snapping vector field that is defined by computing, at each pixel, a gradient of a greyscale version of a color image. To use full color information one may compute a direction of maximum color difference and a magnitude of color difference in that direction. However, because color is generally defined in terms of three or more color channels, determining the maximum color difference, and thus defining the edge snapping vector field, is not straightforward. Existing solutions avoid this complexity by first converting the color image to a grayscale image from which the edge snapping vector field is more easily defined. While this simplifies the process of determining the maximum color difference at a given pixel, it unfortunately causes certain edges to weaken significantly, or worse, to disappear altogether. This is particularly likely to occur at interfaces between visually different colors that appear similar or identical when represented in greyscale. Thus edge detection techniques which use greyscale conversion often have a difficult time reliably detecting edges that separate adjoining regions of different color, despite the fact that such regions may seem clearly distinguishable to the human eye. The result is a failure to detect edges in the processed image accurately and reliably, which in turn represents a substantial obstacle to satisfying consumer demand.

Thus, and in accordance with certain of the embodiments disclosed herein, techniques are provided for detecting edges in a color image by analyzing variations in multiple color channels which are used to characterize the image. No greyscale conversion is performed, thereby preserving color differences which might otherwise be lost in such a conversion. Instead, gradients in multiple color channels are merged to compute a single edge snapping vector field from which edge locations can be derived. Furthermore, by retaining the multidimensional characterization of the colors that comprise the processed image, a maximum color difference can be calculated using parameters which more closely correspond to human perceptions of color. For example, in one embodiment maximum color difference is formulated using the LUV color model defined by the International Commission on Illumination (CIE) in 1976. In another embodiment maximum color difference is formulated using a red-green-blue (RGB) color model. Other multidimensional color models can be used in other embodiments. Regardless of the particular model used to represent the colors comprising a source image, the Euclidian distance between two pixels characterized using a multidimensional color model will more closely approximate a perceived visual color difference between the pixels, as compared to the Euclidian distance between the same two pixels characterized using a greyscale color model. An edge snapping vector field is derived from these Euclidian distances, thereby providing a more accurate basis for subsequent edge detection. The result is a robust automated edge detection methodology that is able to more accurately detect interfaces between different color fields, even where such color fields have a similar appearance when rendered in greyscale. Numerous configurations and variations of such embodiments will be apparent in light of this disclosure.

The edge detection techniques disclosed herein can be applied globally to detect edges over an entire source image, or selectively to detect edges in a sub-region of the source image. For example, in one implementation an edge detection cursor can be moved over an image, such that edges are detected in the region over which the cursor passes. A visual effect is optionally applied to the detected edges, thus enabling the edge detection cursor to selectively apply an imaging effect to an arbitrarily-shaped, user-designated portion of the image. An edge detection cursor that provides more accurate edge detection within a narrowly-focused region defined by the user can be particularly useful in applications where a user seeks automated assistance in drawing a boundary in the source image.

As used herein, the term "color" refers, in addition to its ordinary meaning, to a characteristic of light that can be parametrically defined according to a variety of different multidimensional color models. For example, the aforementioned RGB color model can be used to define a color based on three values (r, g, b) that correspond to the relative contributions of red, green, and blue light, respectively, that are used to form the color. The RGB color model is useful for the sensing, representation, and display of color in electronic systems, but the (r, g, b) values are often non-intuitive in terms of establishing meaningful relationships between the visual appearance of different colors as perceived by the human eye. For example, a dark brown color can be represented by (r, g, b) values (44, 29, 7), while a similar but lighter cream color can be represented by (r, g, b) values (221, 207, 187). The large difference in the (r, g, b) parameters used to represent these two colors belies the fact that they appear as darker and lighter shades of the same color. Therefore, other color models which provide more meaningful relationships between colors are often used in the context of color selection. Examples of such color models include the aforementioned LUV color model, a hue-saturation-brightness (HSB) color model, and a hue-saturation-luminosity (HSL) color model. These color models rely on parameters such as hue, brightness, saturation, and luminosity. Black and white are included within the definition of the word "color", as defined and used herein.

As used herein, the term "greyscale" refers, in addition to its ordinary meaning, to a representation of the visual appearance of a picture element, such as a pixel that forms part of a digital image. A greyscale representation carries only intensity information, and thus represents color as a range of shades of gray, varying from black at the weakest intensity to white at the strongest. A greyscale representation of visual appearance of a pixel can therefore be understood as a unidimensional representation of intensity only, as contrasted with a multidimensional representation of multiple color channels, such as hue, saturation, and brightness. Color images can be converted to greyscale by weighting the different color channels in a particular way and then combining the weighted channels into a single normalized greyscale intensity. Appropriate weighting of the color channels can effectively represent the visual effect of black and white photography. In computing applications, image pixels are commonly stored with eight binary digits per pixel, which allows a single eight-digit byte to represent one of $2^8$=256 different shades of gray.

As used herein, the term "edge snapping vector field" refers, in addition to its ordinary meaning, to a vector field corresponding to a pixel array, such as a pixel array that forms a digital image, wherein a direction of maximum color difference and a magnitude of color difference in that direction are calculated for each pixel in the array. An edge snapping vector field can therefore be understood as a representation of both the direction and magnitude of change in color intensity in an image. This change will be greatest at color interfaces, with the magnitude of change being indicative of edge strength. For example, interfaces between visually distinct colors will correspond to a relatively larger magnitude of color change, which in turn represents a strong edge. Likewise, interfaces between visually similar colors will correspond to a relatively smaller magnitude to color change, which in turn represents a weak edge. The edge snapping vector field will point towards a detected edge from either side of the edge. When applied globally over a digital image, the edge snapping vector field may also be referred to as an "image gradient".

System Architecture

FIG. 1 is a block diagram schematically illustrating selected components of an example of a computer system 100 that can be used to detect edges in a color image by analyzing variations in multiple color channels which are used to characterize the image. Computer system 100 may comprise, for example, one or more devices selected from a desktop computer, a laptop computer, a workstation, a tablet computer, a smartphone, a handheld computer, a set-top box, an enterprise class server, or any other such computing device. A combination of different devices may be used in certain embodiments. In the illustrated embodiment, computer system 100 includes, among other things, a processor 110, a memory 120, an operating system 140, a communication module 150, an application user interface 160, and a local image repository 170. As can be further seen, a bus and/or interconnect 180 is also provided to allow for inter- and intra-device communications using, for example communication module 150.

Depending on the particular type of device used for implementation, computer system 100 is optionally coupled to or otherwise implemented in conjunction with one or more peripheral hardware components 500. Examples of peripheral hardware components 500 include a display 510, a textual input device 520 (such as a keyboard), and a pointer-based input device 530 (such as a mouse). One or more other input/output devices, such as a touch sensitive display, a speaker, a printer, or a microphone, can be used in other embodiments. For example, in a particular alternative embodiment wherein computer system 100 is implemented in the form of a tablet computer, functionality associated with the particular peripheral hardware components 500 illustrated in FIG. 1 is provided instead by a touch sensitive surface that forms part of the tablet computer. In general, computer system 100 may be coupled to a network 300 to allow for communications with other computing devices or resources, such as networked image processing services 800 and/or a networked image repository 900. Other components and functionality not reflected in the schematic block diagram of FIG. 1 will be apparent in light of this disclosure, and thus it will be appreciated that other embodiments are not limited to any particular hardware configuration.

Processor 110 can be any suitable processor, and may include one or more coprocessors or controllers, such as an audio processor or a graphics processing unit, to assist in control and processing operations associated with computer system 100. Memory 120 can be implemented using any suitable type of digital storage, such as one or more of a disc drive, a universal serial bus (USB) drive, flash memory, and/or random access memory (RAM). Operating system 140 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently-developed platform. Communication module 150 can be any appropriate network chip or chipset which allows for wired and/or wireless connection to other components of computer system 100, and/or to network 300, thereby enabling computer system 100 to communicate with other local and/or remote computer systems, servers, and resources.

Application user interface 160 is configured to provide a user interface that is capable of providing information to, and receiving information from, a user of computer system 100. The provided user interface can be implemented using, or otherwise used in conjunction with, peripheral hardware components 500. In certain embodiments application user interface 160 is installed local to computer system 100, as shown in the example embodiment of FIG. 1. However, in alternative embodiments computer system 100 is implemented in a client-server environment wherein at least some portion of application user interface 160 is provided to computer system 100 using an applet, such as a JavaScript applet, or other downloadable module. Such a remotely-provisioned module can be provided in real-time in response to a request from computer system 100 for access to a server having resources that are of interest to the user of computer system 100. Examples of such resources include networked image processing services 800 and/or networked image repository 900, the latter of which may include images or other digital content that the user wishes to manipulate. The server, if applicable, may be local to network 300 or may be remotely coupled to network 300 by one or more other networks or communication channels. In any such standalone or networked computing scenarios, application user interface 160 can be implemented with any suitable combination of technologies that allow a user to interact with computer system 100. In one particular example embodiment, application user interface 160 is provided by an digital image editing software application such as Adobe® Photoshop®.

In certain embodiments application user interface 160 includes a user interface sub-module 162 configured to receive user input that identifies a source image and an edge detection operation to be applied to the image. In certain implementations the edge detection operation consists essentially of edge detection, and returns an image comprising (or other information regarding) the detected edges. However in other embodiments the edge detection operation includes further image modification, such as application of an imaging effect to the detected edges. In still other embodiments the edge detection operation forms part of a larger workflow that involves manipulating a localized portion of a larger image, wherein the localized portion is defined by the detected edges. Thus, in addition to receiving user input, user interface sub-module 162 can also be configured to display a modified image, such as a modified version of a source image wherein an imaging effect has been applied or wherein edges have been indicated visually. The edge detection operation can be applied globally to the entire source image or locally to a smaller portion of the source image. For example, in one implementation the user interface sub-module 162 is configured to provide an edge detection cursor such that the edge detection operation is performed only in areas selected or otherwise indicated by the cursor. Functionality associated with user interface sub-module 162 can be implemented using any of a wide variety of suitable user interface elements, such as dialog boxes, control panels, display windows, pointer elements, menu bars, toolbars, dropdown menus, and context menus.

Still referring to the example embodiment illustrated in FIG. 1, application user interface 160 also includes an edge detection sub-module 164. Edge detection sub-module 164 is configured to detect edges in a color image by analyzing variations in multiple color channels which are used to characterize the image. This can be accomplished, for example, by merging gradients in multiple color channels to produce a single edge snapping vector field from which edge locations can be derived. In such embodiments edge detection sub-module 164 generates edge data which can be used, for example, to produce a new image that includes only the detected edges, or which can form the basis for a subsequent imaging operation. Examples of subsequent imaging operations which can leverage the edge data include operations which apply a visual effect to the detected edges (such as a smoothing, blurring, diffusing, or sharpening effect), and operations which manipulate a localized portion of an image defined by the detected edges (such as a localized visual effect or a copy/cut operation). Additional details regarding the operation of edge detection sub-module 164 will be described in turn.

The subsequent imaging operations are optionally performed by an image manipulation sub-module 166 which is also included as part of application user interface 160. In particular, image manipulation sub-module 166 is configured to receive edge data generated by edge detection sub-module 164 and manipulate the appearance of the source image based on such data. Image manipulation sub-module 166 is optionally capable of leveraging networked image processing services 800, which is particularly useful in implementations wherein application user interface 160 is implemented on a computing device having limited processing capacity, such as a tablet computer or a smartphone. This allows smaller, less powerful devices to harness the processing capacity and functionality associated with a larger computing system.

Referring still to the example embodiment illustrated in FIG. 1, computer system 100 optionally includes local image repository 170 which comprises one or more locally stored images, as well as corresponding image metadata. In some cases the image metadata includes edge data which defines edges located within a corresponding image; such edge data may be generated by edge detection sub-module 164. Local image repository 170 can be implemented using any suitable type of digital storage, such as a USB drive, a memory card, or a disc drive. In alternative embodiments computer system 100 is additionally or alternatively in communication with networked image repository 900, which comprises one or more remotely stored images and corresponding metadata. In certain embodiments networked image repository 900 is implemented in the form of cloud storage. In embodiments wherein network 300 comprises a local network such as a Bluetooth or Wi-Fi connection between computer system 100 and an imaging device such as a digital camera or a smartphone, networked image repository 900 comprises a memory resource provided by the imaging device itself. In some implementations application user interface 160 is configured to access both local and networked image repositories to identify images which are to be processed by edge detection sub-module. Likewise, in such embodiments application user interface 160 is further configured to store edge data generated by edge detection sub-module 164 as metadata associated with a given image in both local and networked image repositories. It will be appreciated that, in general, the images stored in the local and/or networked image repositories may not necessarily be associated with the same user who is associated with the source image, or who is otherwise interacting with application user interface 160.

Computer system 100 can communicate with the various networked services and resources described herein via network 300. Network 300 may be a local area network (such as a home-based or office network), a wide area network (such as the Internet), a peer-to-peer network (such as a Bluetooth connection), or a combination of such networks, whether public, private, or both. For example, in certain embodiments at least a portion of the functionality associated with network 300 is provided by a cellular data network, thereby making it easier for users of smartphones and tablet computers to leverage networked resources. In general, communications amongst the various entities and resources described herein may occur via wired and/or wireless connections, such as may be provided by Wi-Fi or mobile data networks. In some cases access to resources on a given network or computing system may require credentials such as a username and password, and/or may require compliance with any other suitable security mechanism.

The embodiments described herein can be implemented in various forms of hardware, software, firmware, and/or special purpose processors. For example, in one embodiment a non-transitory computer readable medium has instructions encoded thereon that, when executed by one or more processors, cause one or more of the edge detection methodologies described herein to be implemented. The instructions can be encoded using any suitable programming language, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into a variety of different software applications, such as image editing software applications, word processing applications, desktop publishing applications, and presentation applications. For example, a word processing application can be configured to manipulate digital images that are to be incorporated into a word processing document. The word processing application can therefore be configured to implement certain of the functionalities disclosed herein to facilitate such image manipulation. The computer software applications disclosed herein may include a number of different modules, sub-modules, or other components of distinct functionality, and can provide information to, or receive information from, still other components and services. These modules can be used, for example, to communicate with peripheral hardware components 500, networked storage resources such as networked image repository 900, or other external components. More generally, other components and functionality not reflected in the illustrations will be apparent in light of this disclosure, and it will be appreciated that the present disclosure is not intended to be limited to any particular hardware or software configuration. Thus in other embodiments the components illustrated in FIG. 1 may comprise additional, fewer, or alternative subcomponents.

The aforementioned non-transitory computer readable medium may be any suitable medium for storing digital information, such as a hard drive, a server, a flash memory, and/or random access memory. In alternative embodiments, the computers and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and/or firmware can be used, and that the present disclosure is not intended to be limited to any particular system architecture.

Methodology

Figure 2:
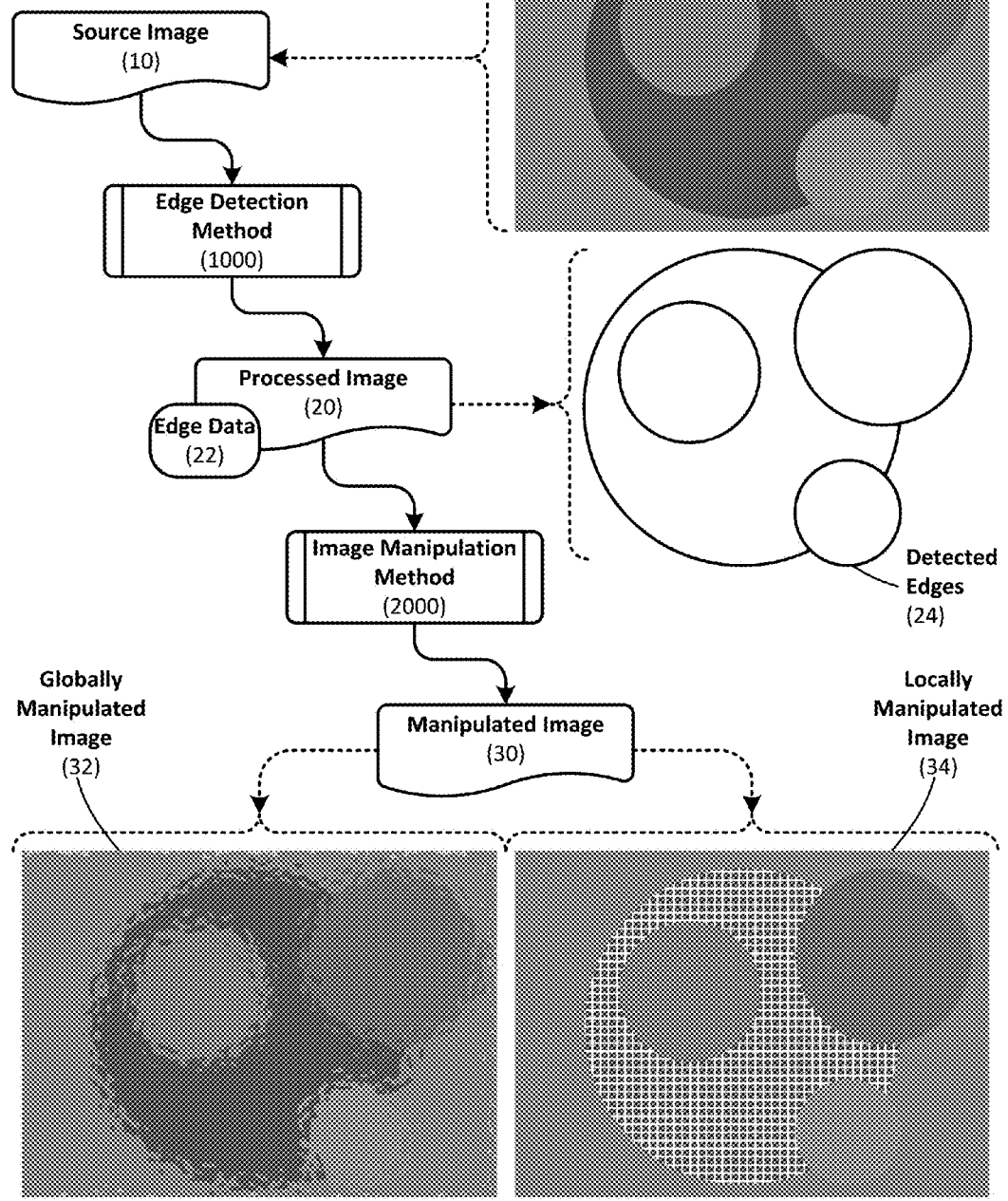
FIG. 2 is a data flow diagram schematically illustrating data flows in an example image manipulation technique that includes detecting edges in a color image by analyzing variations in multiple color channels which are used to characterize the image.
Figure 3:
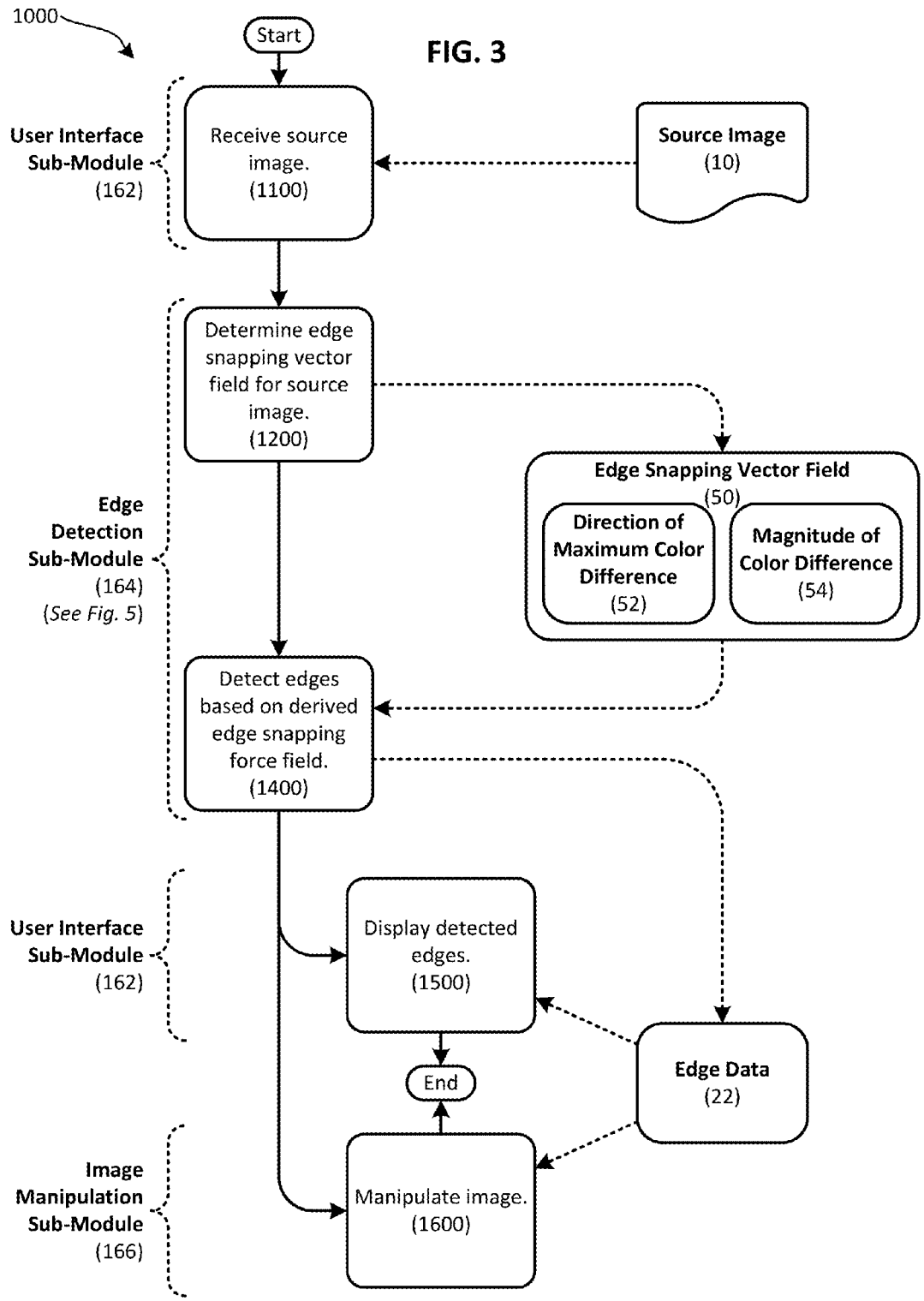
FIG. 3 is a flowchart schematically illustrating an example of an edge detection method that includes analyzing variations in multiple color channels which are used to characterize a digital image.

FIG. 2 is a data flow diagram schematically illustrating data flows in an example image manipulation technique that includes detecting edges in a color image by analyzing variations in multiple color channels which are used to characterize the image. FIG. 3 is a flowchart schematically illustrating an example of an edge detection method 1000 that includes analyzing variations in multiple color channels which are used to characterize a digital image. As can be seen, edge detection method 1000 includes a number of phases and sub-processes, the sequence of which may vary from one embodiment to another. However, when considered in the aggregate, these phases and sub-processes form a complete edge detection technique that is responsive to user input in accordance with certain of the embodiments disclosed herein. Edge detection method 1000 can be implemented, for example, using the system architecture illustrated in FIG. 1 and described herein. However, other system architectures can be used in other embodiments, as will be apparent in light of this disclosure. To this end, the correlation of the various functionalities illustrated in FIG. 3 to the specific components illustrated in FIG. 1 is not intended to imply any structural and/or use limitations. Rather other embodiments may include, for example, varying degrees of integration where multiple functionalities are effectively performed by one system or module. For example, in an alternative embodiment, a single module can be used to provide edge detection and image manipulation functionality. Thus other embodiments may have fewer or more modules depending on the granularity of implementation. Numerous variations and alternative configurations will be apparent in light of this disclosure.

As illustrated in FIGS. 2 and 3, edge detection method 1000 can be understood as commencing upon receipt of a source image 10. See reference numeral 1100 in FIG. 3. For instance, in certain embodiments user interface sub-module 162 is used to acquire source image 10 from local image repository 170 or networked image repository 900. In applications where edge detection method 1000 is to be applied selectively to a portion of an image (as opposed to globally to an entire image), user interface sub-module 162 can be configured to define the selection, for example based on motion of a cursor or other pointing device. In one implementation, receiving source image 10 may comprise opening source image 10 in a digital image editing software application that provides one or more implementations of the edge detection functionality disclosed herein.

Regardless of how it is received, source image 10 can be understood as comprising a plurality of different colors, with edges existing at distinct boundaries between different colors. While FIG. 2 illustrates an abstract source image that includes a plurality of different colored circles on a colored background, in other embodiments edge detection method 1000 can be applied to different types of source images, including color photographs. Source image 10 can be stored using any of a wide variety of standardized or proprietary file formats, including compressed or uncompressed formats. For instance, in certain embodiments the edge detection methodologies disclosed herein can be applied to digital images saved using the JPEG, TIFF, GIF, BMP, PNG, PSD, or PSB formats. However, these systems and methods can also be used with other existing or subsequently developed file formats in other embodiments. Moreover, regardless of the particular file format used to store source image 10, the various colors that comprise source image 10 can be parametrically defined according to a variety of different multidimensional color models, examples of which include the aforementioned RGB and LUV color models. In some cases source image 10 may comprise a multispectral image that includes image data at frequencies outside the visible portion of the electromagnetic spectrum. For example, in one implementation source image 10 may include data in seven, ten, twelve, or more spectral channels. Examples of such spectral channels that are invisible to the human eye include infrared wavelengths of 0.7 µm to greater than 10 µm, classified as near infrared, middle infrared, and far infrared.

Once source image 10 is received or otherwise defined, edge detection sub-module 164 is configured to determine an edge snapping vector field 50 for source image 10. See reference numeral 1200 in FIG. 3. Edge snapping vector field 50 comprises, for each pixel comprising source image 10, a direction of maximum color difference 52 and a magnitude of color difference 54 in that direction. If these color differences are characterized in terms of color parameters that closely correspond to human perception of color, edges detected based on edge snapping vector field 50 will correspond to edges that human vision perceives as forming an interface between visually distinct colors. One example of color parameters that closely correspond to human perception of color are those parameters provided by the aforementioned LUV color model. Once edge snapping vector field 50 is determined, edge detection sub-module 164 is further configured to detect edges in source image 10 based on an edge snapping force field which is a derivative of edge snapping vector field 50. See reference numeral 1400 in FIG. 3. The edge snapping force field can be understood as pointing toward opposite sides of a detected edge. Additional details regarding the operations of edge detection sub-module 164 will be described in turn.

Figure 4:
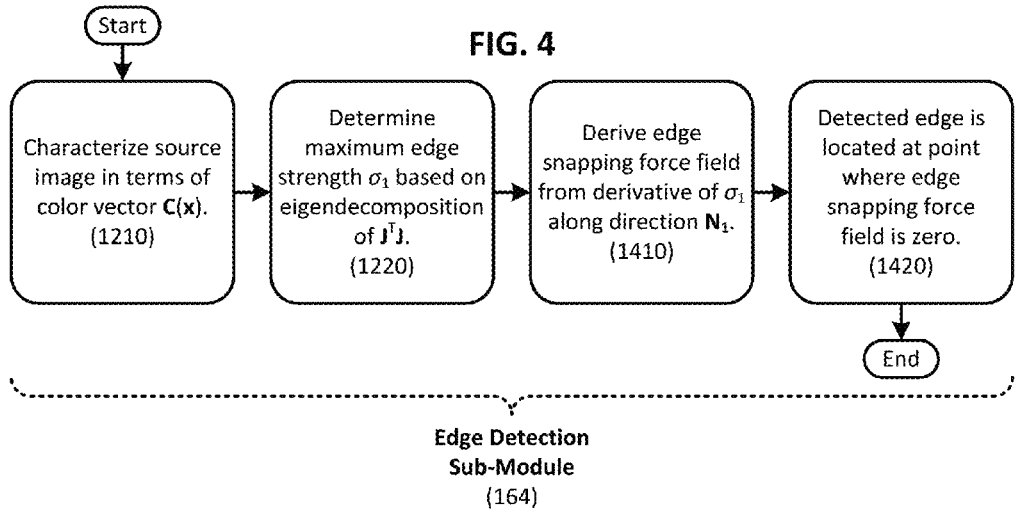
FIG. 4 is a flowchart schematically illustrating an example technique for locating a detected edge based on a three-dimensional color vector that is used to characterize the colors that comprise a source image.

FIG. 4 is a flowchart schematically illustrating an example technique for locating a detected edge based on a three-dimensional color vector that is used to characterize the colors that comprise source image 10. This technique can be performed by edge detection sub-module 164, and corresponds to one example implementation of the operations represented by reference numerals 1200 and 1400 in FIG. 3. As noted above, this technique commences with characterizing source image 10 in terms of a color vector $C(x)$. See reference numeral 1210 in FIG. 4. Color vector $C(x)$ can be defined in terms of three color parameters at position x in source image 10, where $C(x)$ is within a three dimensional color space and x is defined in terms of two real spatial coordinates. For example, in an implementation wherein the colors comprising source image 10 are defined using the LUV color model, $$C(x) = \begin{bmatrix} L(x) \\ u(x) \\ v(x) \end{bmatrix} \in \mathbb{R}^3 \tag{1}$$

and $$x = \begin{bmatrix} x \\ y \end{bmatrix} \in \mathbb{R}^2. \tag{2}$$

To establish a direction and magnitude of maximum color change in source image 10, consider two positions in source image 10. The first position is at an arbitrary position x. The second position is at a nearby position (x+hr), that is, at a distance h from x along direction r, wherein r is a unit vector having magnitude $\|r\|=1$. The amount of color difference that a human perceives between the first and second positions, expressed in terms of the LUV color model used to represent $C(x)$, is therefore $\|C(x+hr)-C(x)\|$. The rate of color change in direction r is thus provided by $$\lim_{h \to 0} \left\| \frac{C(x+hr) - C(x)}{h} \right\| = \left\| \frac{\partial C}{\partial x} r \right\|. \tag{3}$$

Thus the norm of the directional vector derivative provided in Equation (3) corresponds to the strength of a given edge that a human will perceive in the direction r. The most visible edge is perpendicular to r so as to maximize this derivative. The unit vector r therefore has a direction corresponding to the maximum color difference in LUV color space.

It is possible to formulate the direction r using the Jacobian J. At the outset, it should be noted that $$J = \frac{\partial C}{\partial x} = \begin{bmatrix} \frac{\partial L}{\partial x} & \frac{\partial L}{\partial y} \\ \frac{\partial u}{\partial x} & \frac{\partial u}{\partial y} \\ \frac{\partial v}{\partial x} & \frac{\partial v}{\partial y} \end{bmatrix} \in \mathbb{R}^{3 \times 2}, \tag{4}$$

which represents the magnitude of the spatial change in color vector $C(x)$ along direction r. Thus r can be expressed as $$r = \operatorname*{argmax}_{|r|=1}\left(\lim_{h\to 0}\left\|\frac{C(x+hr)-C(x)}{h}\right\|\right) = \operatorname*{argmax}_{|r|=1}\left\|\frac{\partial C}{\partial x}r\right\| = \operatorname*{argmax}_{r}\left\|\frac{\partial C}{\partial x}r\right\|^2 \quad (5)$$

$$r = \operatorname*{argmax}_{r}\|Jr\|^2 = \operatorname*{argmax}_{r}(r^T J^T J r). \quad (6)$$

The matrix $J^T J$ is a symmetric 2×2 matrix, and thus it is possible to determine the eigendecomposition of this matrix analytically. In particular, the eigendecomposition of $J^T J$ is the factorization $V \Lambda V^T$, where $$V = [N_1 N_2] \quad (7)$$

and $$\Lambda = \begin{bmatrix} \lambda_1 & 0 \\ 0 & \lambda_2 \end{bmatrix}. \quad (8)$$

It can be assumed that $\lambda_1 \geq \lambda_2 \geq 0$ without loss of generality. Since $J^T J$ is symmetric, $\|N_1\|=\|N_2\|=1$ and $N_1 \cdot N_2 = 0$. Therefore $$J^T J = V \Lambda V^T = [N_1\ N_2]\begin{bmatrix} \lambda_1 & 0 \\ 0 & \lambda_2 \end{bmatrix}\begin{bmatrix} N_1^T \\ N_2^T \end{bmatrix} = \lambda_1 N_1 N_1^T + \lambda_2 N_2 N_2^T. \quad (9)$$

In this case $N_1$ is the eigenvector associated with the largest eigenvalue $\lambda_1$. This provides the directional aspect of the edge snapping vector field. This is because $N_1 = r$ based on the following:

$$r^T J^T J r = r^T (\lambda_1 N_1 N_1^T + \lambda_2 N_2 N_2^T) r \quad (10)$$

$$r^T J^T J r = \lambda_1 r^T N_1 N_1^T r + \lambda_2 r^T N_2 N_2^T r = \lambda_1 (r \cdot N_1)^2 + \lambda_2 (r \cdot N_2)^2. \quad (11)$$

Since $\|r\|=\|N_1\|=\|N_2\|=1$ and $N_1 \cdot N_2 = 0$, let $\theta$ be the angle between $r$ and $N_1$. Then $$r^T J^T J r = \lambda_1 \cos^2\theta + \lambda_2 \sin^2\theta = \lambda_1 \cos^2\theta + \lambda_2(1-\cos^2\theta) \quad (12)$$

$$r^T J^T J r = (\lambda_1 - \lambda_2)\cos^2\theta + \lambda_2. \quad (13)$$

Because $\lambda_1 \geq \lambda_2$, $r^T J^T J r \leq (\lambda_1 - \lambda_2) + \lambda_2 = \lambda_1$ when $\theta = 0$, and therefore $r = \operatorname*{argmax}_{r}(r^T J^T J r) = N_1$. \quad (14)

This establishes that $$\left\|\frac{\partial C}{\partial x} r\right\| = \sqrt{\lambda_1} \quad (15)$$

is the maximum edge strength when $r = N_1$. In this case, let $\sigma_1 = \sqrt{\lambda_1}$, which corresponds to the maximum edge strength, which is determined based on the eigendecomposition of $J^T J$. See reference numeral 1220 in FIG. 4.

Based on the foregoing, it is now possible to define an edge snapping force field. The edge snapping force is an attracting force toward maximum edge strength locations, and has no force where the edge strength is at a maximum. The direction of the edge snapping force field is perpendicular to the edge, and thus has the same direction as $r = N_1$. The edge snapping force field can therefore be understood as always being directed toward a detected edge. Thus the edge snapping force field can be obtained by taking the derivative of $\sigma_1$ along the direction $N_1$. See reference numeral 1410 in FIG. 4. Thus the edge snapping force field is defined by $$\frac{\partial}{\partial x}\left\|\frac{\partial C}{\partial x}\cdot N_1\right\| N_1 = \frac{\partial \sigma_1}{\partial x} \cdot N_1. \quad (16)$$

Figure 5:
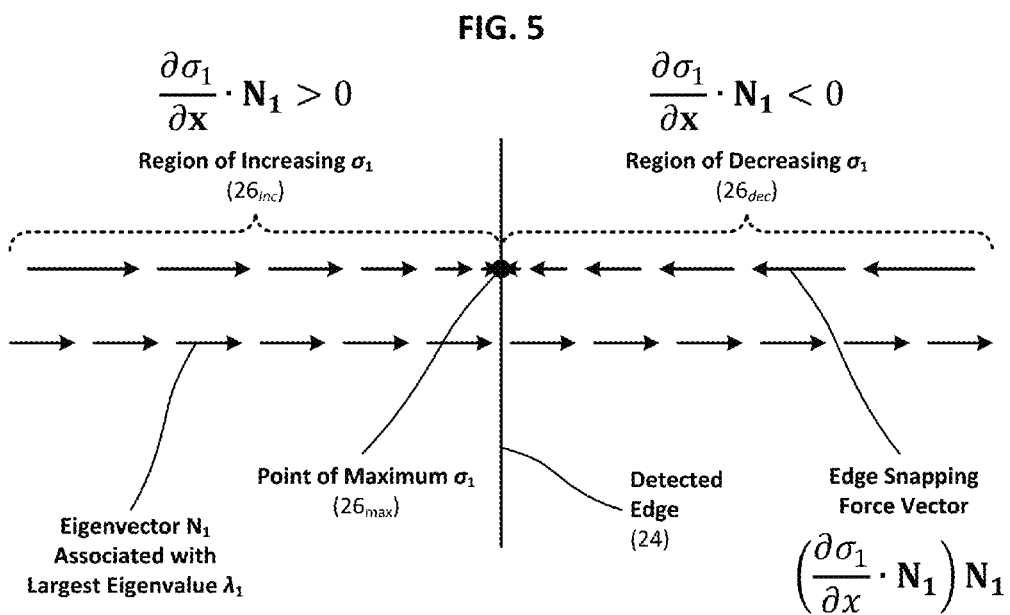
FIG. 5 is a schematic illustration of a detected edge having a region of increasing $\sigma_1$ on one side of the edge, a region of decreasing $\sigma_1$ on the opposite side of the edge, and a point of maximum $\sigma_1$ occurring at the detected edge.

This represents the derivative of the rate of color change along the vector $N_1$, which corresponds to the rate of change in $\sigma_1$, the maximum edge strength. FIG. 5 is a schematic illustration of a detected edge 24 having a region of increasing $\sigma_1$ on one side of the edge (see reference numeral 26$_{inc}$), a region of decreasing $\sigma_f$ on the opposite side of the edge (see reference numeral 26$_{dec}$), and a point of maximum $\sigma_1$ occurring at the detected edge itself (see reference numeral 26$_{max}$). The edge snapping force field is therefore positive if the strength is increasing along $N_1$, and is negative if the strength is decreasing along $N_1$. The edge snapping force is thus given by $$\left(\frac{\partial \sigma_1}{\partial x}\cdot N_1\right) N_1. \quad (17)$$

This quantity can be understood as representing a velocity toward detected edge 24, at which point the rate of color change (or alternatively, the velocity toward the detected edge) becomes zero. Thus, $$\text{If } \left\|\frac{\partial C}{\partial x} N_1\right\| \text{ increases along } N_1, \text{ then } \frac{\partial \sigma_1}{\partial x}\cdot N_1 > 0, \quad (18)$$

and $$\text{If } \left\|\frac{\partial C}{\partial x} N_1\right\| \text{ decreases along } N_1, \text{ then } \frac{\partial \sigma_1}{\partial x}\cdot N_1 < 0. \quad (19)$$

The detected edge is therefore located at the point where the edge snapping force field is zero. See reference numeral 1420 in FIG. 4. The edge snapping force field can be used to solve edge-based level set segmentation problems for which error metrics, such as a squared sum, cannot be used directly. Because the edge snapping force filed is calculated on the basis of the three-dimensional color vector C(x), the result is a segmentation that more closely corresponds to human perception of color.

Referring again to FIGS. 2 and 3, edge detection sub-module 164 can be understood as producing edge data 22 that defines the locations of detected edges 24 in source image 10. In one implementation, edge data 22 can be used to generate a processed image 20 that consists essentially of detected edges 24, which can be displayed by user interface sub-module 162. See reference numeral 1500 in FIG. 3. Each detected edge is optionally associated with edge strength $\sigma_1$, which may be indicated using different colors or other visual indicia in processed image 20. For example, relatively weak edges can be represented by one color (for example, light grey), while relatively strong edges are represented by another color (for example, black).

In an alternative embodiment, edge data 22 and/or processed image 20 are provided to an image manipulation method 2000 that is configured to generate a manipulated image 30 based on edge data 22. For example, in some cases image manipulation sub-module 166 can be used to manipulate source image 10 so as to produce manipulated image 30. See reference numeral 1600 in FIG. 3. In certain implementations manipulated image 30 comprises a globally manipulated image 32, for example wherein a visual effect is applied to detected edges 24 across the entire image. In other implementations manipulated image 30 comprises a locally manipulated image 34, for example wherein one or more detected edges 24 are used to define a sub-region of source image 10 where a visual effect is to be applied locally, or where a copy/paste operation is to be performed. It will be appreciated that a wide range of different manipulations can be performed based on edge data 22, and thus the present disclosure should not be understood as being limited to application of a particular image manipulation, if any.

Figure 6A:
FIG. 6A is an example source image having edges which can be detected using certain of the embodiments disclosed herein.
Figure 6B:
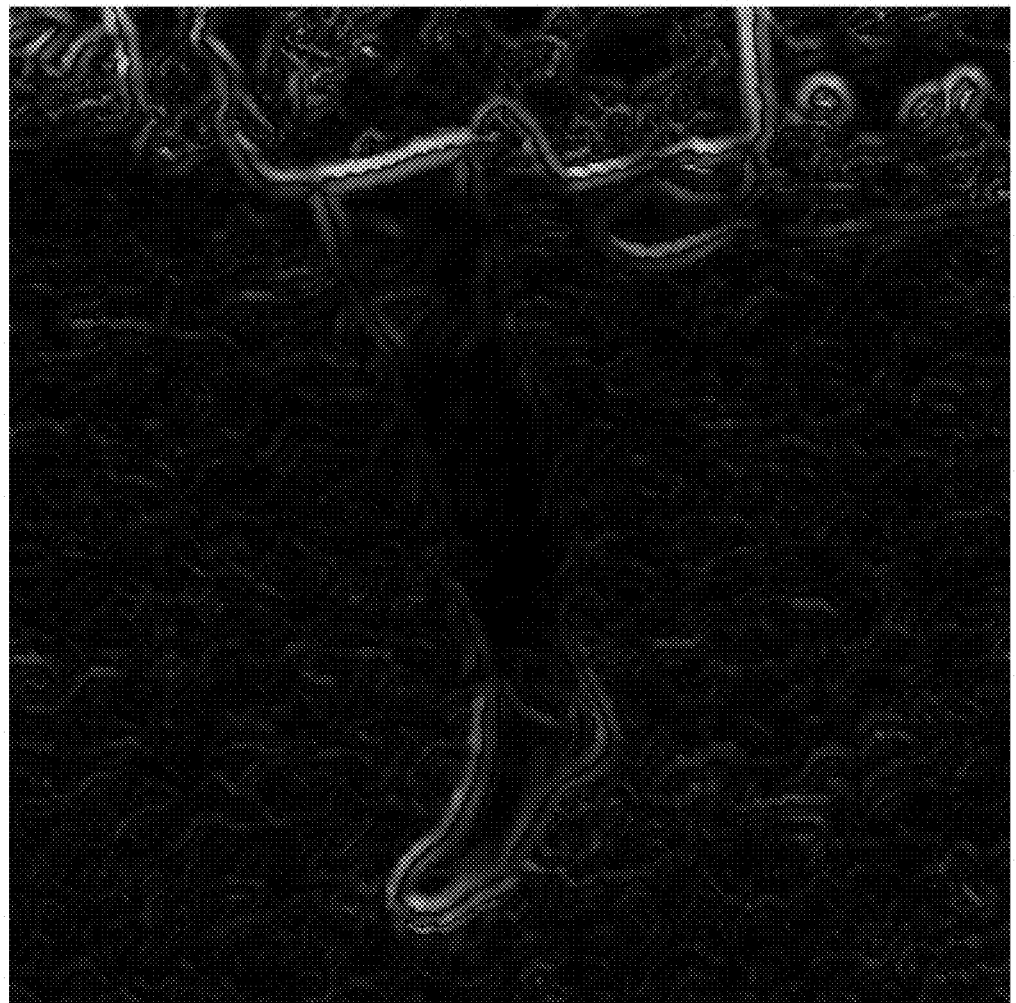
FIG. 6B illustrates detected edges in the source image of FIG. 6A using an existing edge detection process that relies on a greyscale color conversion.
Figure 6C:
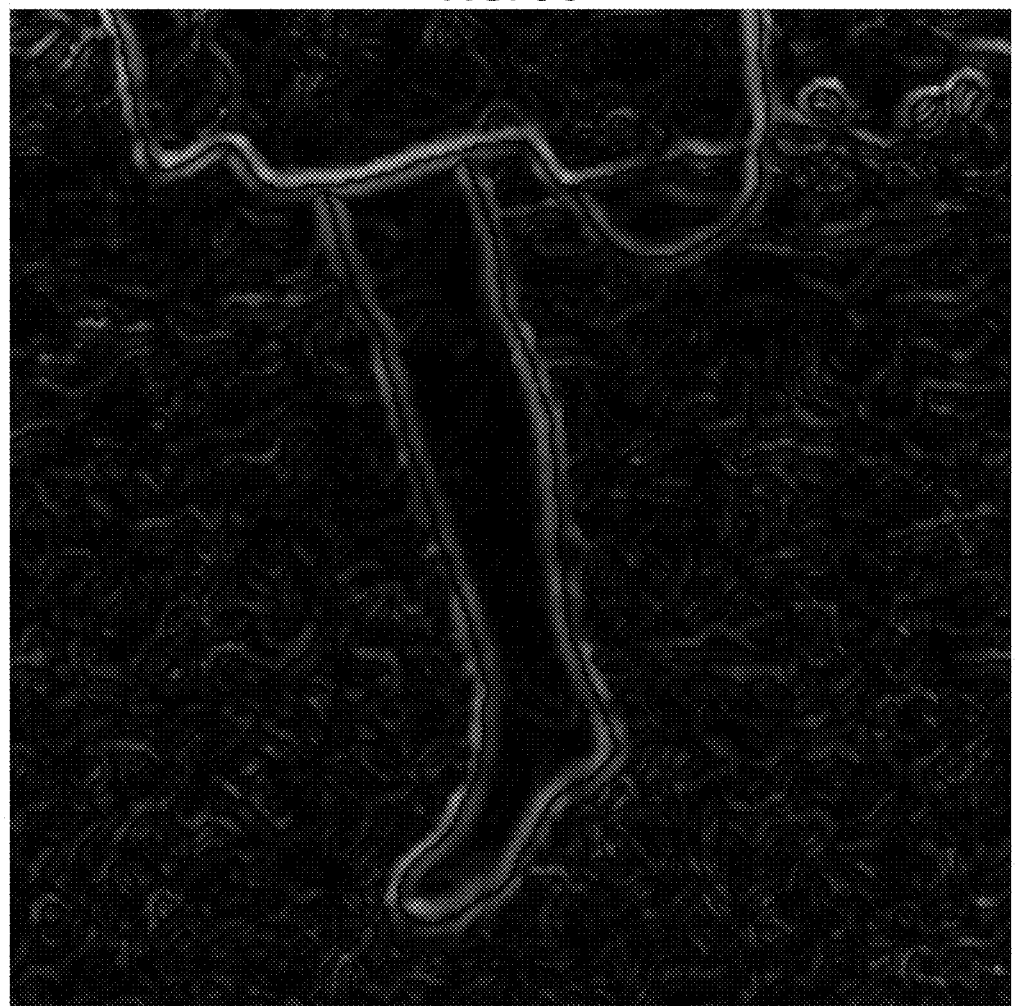
FIG. 6C illustrates detected edges in the source image of FIG. 6A using an example image manipulation technique that analyzes variations in multiple color channels which are used to characterize the image.

FIG. 6A is an example source image 10 having edges which can be detected using certain of the embodiments disclosed herein. Source image 10 comprises a plurality of different colors, with edges existing at distinct boundaries between different colors. Edge strength can be understood as a measure of how distinct a particular boundary appears to the human eye. The various colors that comprise source image 10 can be parametrically defined according to a variety of different multidimensional color models, examples of which include the aforementioned RGB and LUV color models. FIG. 6B illustrates detected edges 24 in the source image 10 using an existing edge detection process that relies on a greyscale color conversion. Such a conversion causes certain edges to weaken significantly, or worse, to disappear altogether. This is evident in FIG. 6B where the girl's leg is barely visible as a result of the edge between the foreground leg and the background grass not being reliably detected. FIG. 6C illustrates detected edges 24 in the source image of FIG. 6A using an example image manipulation technique that analyzes variations in multiple color channels which are used to characterize the image. Once example of such a technique is that illustrated in FIG. 4. As can be seen by comparing the detected edges in FIGS. 6B and 6C, analyzing variations in multiple color channels results in a more reliable edge detection. For instance, in FIG. 6C the edge between the foreground leg and the background grass was detected as a strong edge, and thus is clearly visible. This is a significantly improved result as compared to the result illustrated in FIG. 6B.

The techniques disclosed herein can be applied to a multispectral image that includes, for example, image data at frequencies outside the visible portion of the electromagnetic spectrum. In this case the multispectral color vector C'(x) is defined as $$C'(x) = \begin{bmatrix} C_1(x) \\ C_2(x) \\ \vdots \\ C_n(x) \end{bmatrix} \in \mathbb{R}^3. \quad (20)$$

In this case, the multispectral Jacobian J' is defined as $$J' = \frac{\partial C'}{\partial x} = \begin{bmatrix} \frac{\partial C_1}{\partial x} & \frac{\partial C_1}{\partial y} \\ \frac{\partial C_2}{\partial x} & \frac{\partial C_2}{\partial y} \\ \vdots & \vdots \\ \frac{\partial C_n}{\partial x} & \frac{\partial C_n}{\partial y} \end{bmatrix} \in \mathbb{R}^{n \times 2}, \quad (21)$$

which means that matrix $J'^T J'$ is still a symmetric 2×2 matrix. Thus techniques disclosed herein can also be applied to a multispectral image having more than three channels.

CONCLUSION

Numerous variations and configurations will be apparent in light of this disclosure. For instance one example embodiment provides a computer-implemented method for detecting edges in a digital image. The method comprises receiving a source image. The source image is a multicolor digital image that comprises a plurality of pixels. Each one of the plurality of pixels has a color. The method further comprises characterizing each of the plurality of pixels in terms of three color parameters that define the color of the pixel. The method further comprises determining an edge snapping vector field for the source image based on the three color parameters. The edge snapping vector field comprises a direction of maximum color difference and a magnitude of color difference in the direction. The method further comprises locating an edge in the source image based on the edge snapping vector field. The edge passes through a point where the magnitude of color difference is greater than it is at neighboring points. In some cases the method further comprises performing an image manipulation process that modifies a visual appearance of the located edge in the source image. In some cases (a) the three color parameters are defined according to an LUV color model, and are represented by (L, u, v); (b) a color vector C(x) defines the three color parameters at a pixel located at position x=(x,y) in the source image; and (c) the edge snapping vector field is determined based on an eigendecomposition of $J^T J$, wherein J is provided by Equation (4). In some cases characterizing each of the plurality of pixels in terms of the three color parameters that define the color of the pixel comprises storing a plurality of received color parameters in a memory device. In some cases (a) the source image forms a selected portion a larger digital image; and (b) the source image is defined based on user input that identifies the selected portion. In some cases the source image is a digital photograph. In some cases the three color parameters are defined according to an LUV color model. In some cases determining the edge snapping vector field does not include converting the multicolor digital image into a greyscale image. In some cases the edge is oriented perpendicular to the direction of maximum color difference.

Another example embodiment provides an digital image edge detection system that comprises a processor. The system further comprises a memory. The system further comprises a user interface module configured to receive a source image and display edge data associated with the source image. The source image is a multicolor digital image that comprises a plurality of pixels. Each one of the plurality of pixels has a color that is defined in terms of three color parameters. The system further comprises an edge detection module configured to generate the edge data. The edge data establishes a location of a detected edge in the source image. The edge detection module uses the processor to determine an edge snapping vector field for the source image based on the three color parameters. The location of the detected edge is based on a pixel in the edge snapping vector field where a magnitude of color difference is greater than it is at neighboring pixels. At least one of the user interface module and the edge detection module are further configured to store the edge data in the memory. In some cases the edge data stored in the memory includes metadata that defines an edge strength of the detected edge, the edge strength corresponding to the magnitude of color difference at the location of the detected edge. In some cases (a) the three color parameters are defined according to an LUV color model, and are represented by (L, u, v); (b) a color vector C(x) defines the three color parameters at a pixel located at position x=(x,y) in the source image; and (c) the edge snapping vector field is determined based on an eigendecomposition of $J^T J$, wherein J is provided by Equation (4). In some cases the system further comprises an image manipulation module configured to manipulate an appearance of the source image by applying a visual effect to the location of the detected edge in the source image. In some cases the edge detection module is further configured to derive an edge snapping force field from the edge snapping vector field, the edge snapping force field pointing toward opposite sides of the detected edge. In some cases the source image is not converted to a greyscale image as a part of generating the edge data. In some cases (a) the edge detection module is further configured to generate a color vector field that defines the three color parameters at each of the plurality of pixels; and (b) the three color parameters are defined according to an LUV color model.

Another example embodiment provides a computer program product encoded with instructions that, when executed by one or more processors, causes an edge detection process to be carried out. The edge detection process comprises receiving a source image. The source image is a multicolor digital image that comprises a plurality of pixels, each one of the plurality of pixels having a color. The process further comprises characterizing each of the plurality of pixels in terms of three color parameters that define the color of the pixel. The process further comprises determining an edge snapping vector field for the source image based on the three color parameters. The edge snapping vector field comprises a direction of maximum color difference and a magnitude of color difference in the direction. The process further comprises locating an edge in the source image based on the edge snapping vector field. The edge is located at a point where the magnitude of color difference is greater than it is at neighboring points. In some cases locating the edge further comprises (a) deriving an edge snapping force field from a rate of change of the maximum color difference along the direction of maximum color difference; and (b) determining a location where the edge snapping force field is zero. In some cases the edge detection process further comprises (a) generating edge data characterizing the point where the magnitude of color difference is greater than it is at neighboring points; and (b) saving the edge data as metadata that further characterizes an edge strength at the point, wherein the edge strength at a particular location corresponds to the magnitude of color difference perpendicular to the edge at the particular location. In some cases determining the edge snapping vector field based on the three color parameters does not include converting the multicolor digital image into a greyscale image.

The foregoing detailed description has been presented for the purposes of illustration and description. It is not intended to be exhaustive or to limit the invention to the particular disclosed embodiments. Many modifications and variations are possible in light of this disclosure. Thus it is intended that the scope of the invention be limited not be this detailed description, but rather by the claims appended hereto.

What is claimed is:

1. A computer-implemented method for detecting edges in a multicolor digital image, the method comprising:
   receiving a source image, wherein the source image is a multicolor digital image that comprises a plurality of pixels, each one of the plurality of pixels having a color;
   characterizing each of the plurality of pixels in terms of three color parameters that define the color of the pixel;
   determining an edge snapping vector field for the source image based on the three color parameters, the edge snapping vector field comprising a direction of maximum color difference and a magnitude of color difference in the direction; and
   locating an edge in the source image based on the edge snapping vector field, wherein the edge passes through a point where the magnitude of color difference is greater than it is at neighboring points.

2. The computer-implemented method of claim 1, further comprising performing an image manipulation process that modifies a visual appearance of the located edge in the source image.

3. The computer-implemented method of claim 1, wherein:
   the three color parameters are defined according to an LUV color model, and are represented by (L, u, v);
   a color vector C(x) defines the three color parameters at a pixel located at position x=(x,y) in the source image; and
   the edge snapping vector field is determined based on an eigendecomposition of $J^T J$, $$J = \frac{\partial C}{\partial x} = \begin{bmatrix} \frac{\partial L}{\partial x} & \frac{\partial L}{\partial y} \\ \frac{\partial u}{\partial x} & \frac{\partial u}{\partial y} \\ \frac{\partial v}{\partial x} & \frac{\partial v}{\partial y} \end{bmatrix}.$$

4. The computer-implemented method of claim 1, wherein characterizing each of the plurality of pixels in terms of the three color parameters that define the color of the pixel comprises storing a plurality of received color parameters in a memory device.

5. The computer-implemented method of claim 1, wherein:
   the source image forms a selected portion a larger digital image; and
   the source image is defined based on user input that identifies the selected portion.

6. The computer-implemented method of claim 1, wherein the source image is a digital photograph.

7. The computer-implemented method of claim 1, wherein the three color parameters are defined according to an LUV color model.

8. The computer-implemented method of claim 1, wherein determining the edge snapping vector field does not include converting the multicolor digital image into a greyscale image.

9. The computer-implemented method of claim 1, wherein the edge is oriented perpendicular to the direction of maximum color difference.

10. An edge detection system comprising:
    a processor;
    a memory;
    a user interface module configured to receive a source image and display edge data associated with the source image, wherein the source image is a multicolor digital image that comprises a plurality of pixels, each one of the plurality of pixels having a color that is defined in terms of three color parameters; and
    an edge detection module configured to generate the edge data, wherein the edge data establishes a location of a detected edge in the source image, wherein the edge detection module uses the processor to determine an edge snapping vector field for the source image based on the three color parameters, and wherein the location of the detected edge is based on a pixel in the edge snapping vector field where a magnitude of color difference is greater than it is at neighboring pixels;

wherein at least one of the user interface module and the edge detection module are further configured to store the edge data in the memory.

11. The edge detection system of claim 10, wherein the edge data stored in the memory includes metadata that defines an edge strength of the detected edge, the edge strength corresponding to the magnitude of color difference at the location of the detected edge.

12. The edge detection system of claim 10, wherein:
the three color parameters are defined according to an LUV color model, and are represented by (L, u, v);
a color vector C(x) defines the three color parameters at a pixel located at position x=(x,y) in the source image; and
the edge snapping vector field is determined based on an eigendecomposition of $J^T J$, $$J = \frac{\partial C}{\partial x} = \begin{bmatrix} \frac{\partial L}{\partial x} & \frac{\partial L}{\partial y} \\ \frac{\partial u}{\partial x} & \frac{\partial u}{\partial y} \\ \frac{\partial v}{\partial x} & \frac{\partial v}{\partial y} \end{bmatrix}.$$

13. The edge detection system of claim 10, further comprising an image manipulation module configured to manipulate an appearance of the source image by applying a visual effect to the location of the detected edge in the source image.

14. The edge detection system of claim 10, wherein the edge detection module is further configured to derive an edge snapping force field from the edge snapping vector field, the edge snapping force field pointing toward opposite sides of the detected edge.

15. The edge detection system of claim 10, wherein the source image is not converted to a greyscale image as a part of generating the edge data.

16. The edge detection system of claim 10, wherein:
the edge detection module is further configured to generate a color vector field that defines the three color parameters at each of the plurality of pixels; and
the three color parameters are defined according to an LUV color model.

17. A non-transitory computer readable medium having instructions encoded thereon that, when executed by one or more processors, causes an edge detection process to be carried out, the edge detection process comprising:
receiving a source image, wherein the source image multicolor digital image that comprises a plurality of pixels, each one of the plurality of pixels having a color;
characterizing each of the plurality of pixels in terms of three color parameters that define the color of the pixel;
determining an edge snapping vector field for the source image based on the three color parameters, the edge snapping vector field comprising a direction of maximum color difference and a magnitude of color difference in the direction; and
locating an edge in the source image based on the edge snapping vector field, wherein the edge is located at a point where the magnitude of color difference is greater than it is at neighboring points.

18. The non-transitory computer readable medium of claim 17, wherein locating the edge further comprises:
deriving an edge snapping force field from a rate of change of the maximum color difference along the direction of maximum color difference; and
determining a location where the edge snapping force field is zero.

19. The non-transitory computer readable medium of claim 17, wherein the edge detection process further comprises:
generating edge data characterizing the point where the magnitude of color difference is greater than it is at neighboring points; and
saving the edge data as metadata that further characterizes an edge strength at the point, wherein the edge strength at a particular location corresponds to the magnitude of color difference perpendicular to the edge at the particular location.

20. The non-transitory computer readable medium of claim 17, wherein determining the edge snapping vector field based on the three color parameters does not include converting the multicolor digital image into a greyscale image.

* * * * *